US008266661B2

(12) United States Patent
Hilt et al.

(10) Patent No.: US 8,266,661 B2
(45) Date of Patent: Sep. 11, 2012

(54) METHOD AND APPARATUS FOR PERFORMING TEMPLATE-BASED PREFIX CACHING FOR USE IN VIDEO-ON-DEMAND APPLICATIONS

(75) Inventors: Volker Friedrich Hilt, Middletown, NJ (US); Markus Andreas Hofmann, Fair Haven, NJ (US)

(73) Assignee: Alcatel Lucent, Paris (FR)

( * ) Notice: Subject to any disclaimer, the term of this patent is extended or adjusted under 35 U.S.C. 154(b) by 798 days.

(21) Appl. No.: 12/287,815

(22) Filed: Oct. 14, 2008

(65) Prior Publication Data

US 2010/0095331 A1    Apr. 15, 2010

(51) Int. Cl.
 *H04N 7/173* (2011.01)
(52) U.S. Cl. ............... 725/94; 725/87; 725/91; 725/92
(58) Field of Classification Search .................. None
See application file for complete search history.

(56) References Cited

U.S. PATENT DOCUMENTS

| 6,377,972 | B1 | 4/2002 | Guo et al. | 709/201 |
| 6,708,213 | B1 | 3/2004 | Bommaiah et al. | 709/226 |
| 6,757,796 | B1 | 6/2004 | Hofmann | 711/159 |
| 6,859,840 | B2 | 2/2005 | Singal et al. | 709/232 |
| 7,770,198 | B1* | 8/2010 | Greene | 725/93 |
| 2003/0037331 | A1* | 2/2003 | Lee | 725/32 |
| 2007/0101377 | A1* | 5/2007 | Six et al. | 725/86 |
| 2008/0215747 | A1* | 9/2008 | Menon et al. | 709/231 |
| 2010/0058405 | A1* | 3/2010 | Ramakrishnan et al. | 725/97 |

FOREIGN PATENT DOCUMENTS

WO    WO 2008/088338 A1    7/2008

OTHER PUBLICATIONS

H. Lim, et al, "Protocol considerations for video prefix-caching proxy in wide area networks", *Electronics Letters*, vol. 37, No. 6 (Mar. 15, 2001), pp. 403-404.
S. Sen, et al, "Proxy Prefix Caching for Multimedia Streams", *INFOCOM '99, Eighteenth Annual Joint Conference of the IEEE Computer and Communicatons Societies, Proceedings, IEEE*, Mar. 21-25, 1999, New York, NY., vol. 3, pp. 1310-1319.
S. Gruber, et al, Protocol Considerations for a Prefix-Caching Proxy for Multimedia Streams, *9th International World Wide Web Conference, Proceedings*, Amsterdam, Netherlands, May 2000, 17 pages.

* cited by examiner

*Primary Examiner* — Kristine Kincaid
*Assistant Examiner* — Omar S Parra
(74) *Attorney, Agent, or Firm* — C. Bilicska

(57)    ABSTRACT

A method and apparatus for performing template-based prefix caching advantageously identifies common prefixes (i.e., initial video segments) in video titles, stores common prefixes only once in a prefix cache, and uses these common prefixes when serving requests for video content. This advantageously enables a prefix cache to scale to a large number of video titles, since the cache stores each common prefix only once. A new video title that uses an already existing prefix may be advantageously added without requiring additional storage in the prefix cache. Template-based prefix caching also advantageously reduces the bandwidth required to distribute prefixes when new titles are ingested into the system—if the required template is already available in the prefix cache, prefix-caching is enabled instantly for this title and no additional bandwidth is required to distribute the prefix.

20 Claims, 3 Drawing Sheets

METHOD AND APPARATUS FOR PERFORMING TEMPLATE-BASED PREFIX CACHING FOR USE IN VIDEO-ON-DEMAND APPLICATIONS

FIELD OF THE INVENTION

The present invention relates generally to the field of Video-on-Demand (VoD) services in video broadcast communications networks such as, for example, Internet Protocol Television (IPTV) networks, and more particularly to a method and apparatus for performing prefix caching to minimize startup delays in the use of such applications.

BACKGROUND OF THE INVENTION

Video-on-Demand (VoD) services have become extremely popular in video broadcast communications networks, as is the use of Internet Protocol Television (IPTV) systems. However, it is well known that multimedia applications such as VoD involve the transfer of very large amounts of data, placing a considerable load on the resources of the network, the server and the client. As a result, for example, when the user of a VoD service requests that a given video (e.g., a movie) be played (i.e., downloaded), there will invariably be a significant start-up delay (e.g., 5 to 10 seconds or more) before the video begins playing, because the initial portion of the video must first be transmitted through the network from the server to the client. After this initial delay, however, the streaming of the video is continuous, and so, typically, the remainder of the video can be played without any additional (noticeable) delay.

Various data caching techniques may be advantageously employed to address various performance issues associated with the streaming of multimedia (e.g., video) data. In particular, by caching the video content, much of the delay of downloading the data can be reduced or eliminated. However, it is generally impractical to cache, for example, the entire data content of a complete video library (e.g., one containing all available movies). Thus, a technique known as "prefix caching" has recently been employed, wherein caches store only an initial portion of a multimedia title (e.g., a movie or other video), thereby addressing specifically the problem of the start-up delay.

Specifically, most approaches to prefix caching store a pre-determined fraction of each content item in prefix caches. Usually, the fraction is statically assigned (e.g., the first two minutes of a movie), but more advanced schemes exist that support prefixes with a variable length or prefixes at a given offset within a title. However, all solutions require that a given amount of cache space is dedicated to the prefix of a title. Note that the size of a prefix in a cache depends mainly on the prefix length and the data rate required. And the prefix for each title has to be distributed to prefix caches when a title becomes available, in order to gain the benefit of the technique. If the prefix for a title has not been distributed to a cache, the cache can't perform prefix caching for the given title.

Prefix caching is known to have many advantages—for example, it enables instant playback of a title and it can increase the quality of service by allowing a receiver more time to locate a suitable content source. However, in order for prefix caching to be fully effective, a prefix cache should advantageously contain the prefix of all titles available in a given content distribution network. The above described storage and distribution requirements prevent current prefix-caching solutions from scaling well to content distribution systems that provide for very large content libraries (e.g., a VoD library of movies) or to content distribution networks with a constantly revolving title set (e.g., an IPTV system), since the amount of data that needs to be stored in caches and the traffic generated by constantly updating the prefixes stored may be prohibitive. While large libraries can be supported by storing the prefix of only the most popular items, this provides the benefits of prefix caching (e.g., instant playback) to only those items. Therefore, a more effective solution is needed in these environments that provides prefix caching for large video libraries and video libraries with highly dynamic content.

SUMMARY OF THE INVENTION

In accordance with various illustrative embodiments of the present invention, the novel technique of "template-based prefix caching" is employed to advantageously exploit the similarity of the beginnings of many titles in Video-on-Demand (VoD) and IPTV systems. For example, many movies start with a "trailer" (i.e., an initial portion of the video) that identifies the studio which produced the movie (e.g., the familiar Metro-Goldwyn-Mayer Lion or the Pixar Lamp). Advantageously, these trailers are nearly identical for all movies by the same studio. Similarly, all episodes of a given a TV show, TV sequel, or newscast typically begin with the same trailer. Furthermore, many movies are preceded by trailers which contain legal notices that are the same for all movies within the a given jurisdiction.

In accordance with the principles of the present invention, template-based prefix caching advantageously identifies common prefixes in titles, stores common prefixes only once in a prefix cache, and uses these common prefixes when serving requests for video content. The illustrative embodiments of the present invention advantageously enables a prefix cache to scale to a large number of titles, since the cache stores each common prefix only once. A new title that uses an existing prefix may be advantageously added without requiring additional storage in the prefix cache. In accordance with the illustrative embodiments of the present invention, template-based prefix caching also advantageously reduces the bandwidth required to distribute prefixes when new titles are ingested into the system—if the required template is already available in the prefix cache, prefix-caching is enabled instantly for this title and no additional bandwidth is required to distribute the prefix.

Specifically, one illustrative embodiment of the present invention provides a method and apparatus for use in the delivery of video content comprised in and selected from a plurality of video titles, the method performed with use of a cache and the apparatus comprising a cache. For example, the illustrative method receives a request to deliver video content comprised in a given one of said video titles, identifies one or more prefix templates stored in the cache which are associated with said given one of said video titles, each of said identified prefix templates representing an initial portion of video content comprised in said given one of said video titles and further representing an initial portion of video content comprised in at least one other video title in said plurality of video titles, and delivers the video content represented by said one or more identified prefix templates. Other illustrative embodiments of the invention generate the (common) prefix templates upon the receipt of a new video title and/or assign existing prefix templates to newly ingested video titles.

DETAILED DESCRIPTION OF THE PREFERRED EMBODIMENTS

Figure 1:
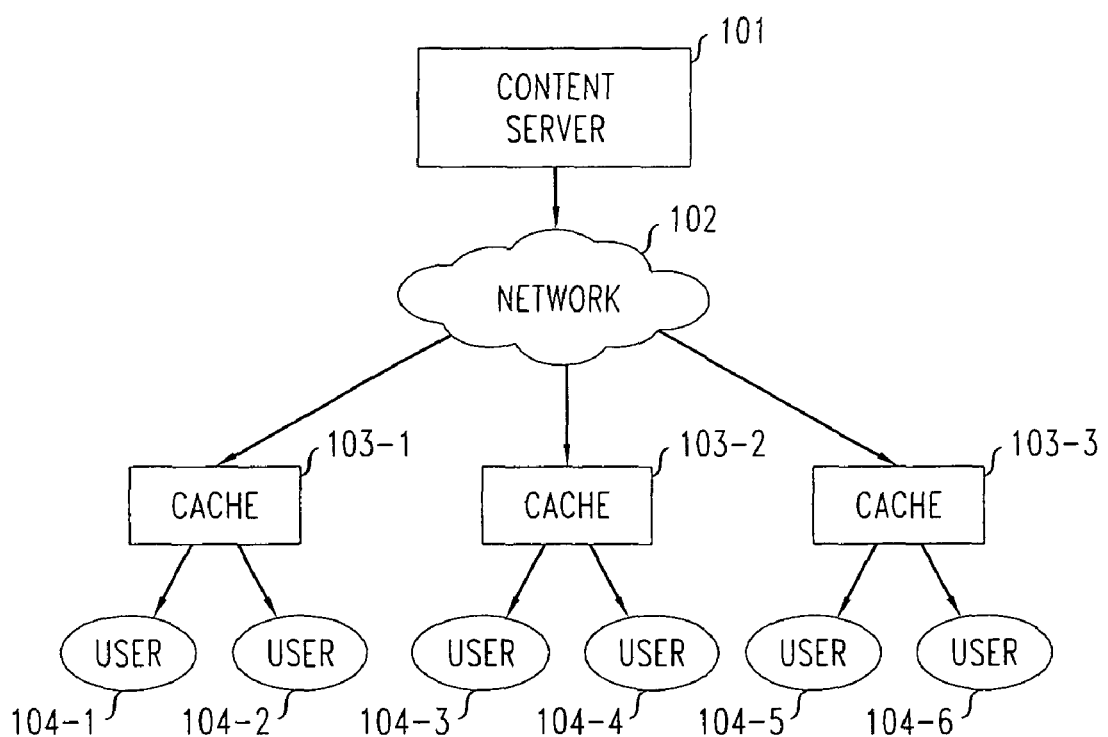
FIG. 1 shows an illustrative caching architecture that may be employed in connection with an illustrative embodiment of the present invention.

FIG. 1 shows an illustrative caching architecture that may be employed in connection with an illustrative embodiment of the present invention. The illustrative architecture includes content server 101 which distributes video content, such as, for example, Video-on-Demand movies or other on-demand content, through network 102, which may, for example, comprise the Internet, to a plurality of users 104-1 through 104-6. In between network 102 and users 104-1 through 104-6, one or more caches (i.e., caches 103-1, 103-2 and 103-3) holding video data are advantageously provided. In accordance with an illustrative embodiment of the present invention, these caches advantageously store video templates which comprise common prefixes of video titles which are included in content server 101. In this manner, when one of users 104-1 through 104-6 request the playback of a video title, a video template which comprises a prefix of the given video title and which has been previously stored in a cache associated with the given user may be advantageously employed to provide nearly instantaneous playback of the beginning of the given video title. (And while the beginning of the video title is being played, the remainder of the video title can be advantageously streamed through the network from content server 101.)

In accordance with various illustrative embodiments of the present invention, the template-based prefixes may be cached at any of a number of possible cache locations in a communications system. Advantageously, the closer the cache is to the end-user, the less the star-up delay is likely to be. For example, in accordance with one illustrative embodiment of the present invention may be included as part of a user's set-top box, thereby providing local prefix storage and thus nearly instantaneous playback start-up to the user.

Alternatively, in an Internet-based communications network implementing, e.g., an IPTV system, the cache which stores template-based prefixes the cache which stores template-based prefixes in accordance with another illustrative embodiment of the present invention may be included as part of the user's Internet Service Provider's (ISP's) server, so that even though the prefix storage is not local to the user, it is still fairly close to the user and thus will result in a very small start-up delay. Finally, as yet another alternative in an Internet-based communications network implementing, e.g., an IPTV system, the cache which stores template-based prefixes in accordance with still another illustrative embodiment of the present invention may be included as part of a content distribution network (CDN) server which may, for example, be employed by the owner of the video server (i.e., the provider of the video delivery service being employed by the user). (Content distribution network servers are fully familiar to those of ordinary skill in the art.) And in the case of DSL (Digital Subscriber Line) based video content delivery environments, in accordance with one illustrative embodiment of the present invention, the cache which stores template-based prefixes may be included as part of a Digital subscriber line access multiplexer (DSLAM), thereby also providing prefix storage which is fairly close to the user and thus will result in a very small start-up delay.

In accordance with an illustrative embodiment of the present invention, a common prefix of a title (i.e., a video program) may be advantageously identified when the title is ingested into the system. For example, such a common prefix may be automatically identified by comparing a portion of the video stream at the beginning of the title with the set of common prefixes which are already stored in the system. If a matching prefix is found, the identifier of this prefix may be advantageously stored in the system together with the title. Such a comparison process may, for example, use conventional video comparison techniques which will be fully familiar to those of ordinary skill in the art. In accordance with certain illustrative embodiments of the present invention, it may be possible to allow a certain difference (which is, for example, less than a predetermined threshold) between the common prefix and the prefix in the given title, in order to advantageously increase the robustness of the common prefix identification process.

In accordance with one illustrative embodiment of the present invention, if no match for a common prefix is found for the given title, the system may attempt to identify (i.e., define) a new common prefix, based on the given title and other titles stored in the system. In particular, in accordance with this illustrative embodiment of the present invention, a short initial segment is extracted from the new title, and that segment serves as a candidate for a common prefix. This segment is then advantageously compared to initial segments of other titles for which no common prefix has yet been identified. If the candidate prefix is, in fact, found in one or more other titles, the system may advantageously compute a largest common prefix for these titles (including the new title being added). This prefix is then advantageously added to the common prefix database and references to this prefix are added to each of the identified titles (including the new title being added). In accordance with an alternative illustrative embodiment of the present invention, a common prefix may be determined manually based on specific knowledge provided, for example, by a content provider. For example, the trailer of a TV sequel may be indicated by the TV show's content provider as being a common prefix to other related TV programs.

As described above, the matching of a prefix associated with a new title to already existing common prefixes and to initial segments of other titles (without a previously identified common prefix) may be performed with use of conventional techniques which will be fully familiar to those of ordinary skill in the art. For example, the video data of the initial portions of the video titles and/or the common prefixes may be decoded (in accordance with the appropriate, associated decoding algorithms corresponding to the algorithms with which the video titles were encoded) into sequences of video frames, and these video frames may then be compared on either a pixel-by-pixel or a block-by-block basis to measure the differences therebetween. This difference may then be compared to a predetermined threshold, and a "match" may then be determined based on the measured difference being less than the predetermined threshold. These measured differences may also be employed to determine whether (and where) a "patch" should be advantageously applied to a given template to provide a better match. (See detailed discussion below.)

In accordance with one illustrative embodiment of the present invention, a new common prefix is distributed to all prefix caches once it has been identified. In accordance with an alternative illustrative embodiment of the present invention, a new prefix may be distributed to each prefix cache when the given cache receives its first request for an associated title or, alternatively, when the sum of the popularity of all associated titles reaches a certain threshold. In accordance with one illustrative embodiment of the present invention, a common prefix may be advantageously removed from the system when it is no longer used in any of the current titles.

In accordance with an illustrative embodiment of the present invention, a given cache may store the identifiers of all titles associated with a common prefix along with the prefix. Then, when a new title is ingested, the identifier of this title is advantageously added to the list of associated titles. In accordance with an alternative illustrative embodiment of the present invention, a server may return the identifier of the common prefix to the given cache in response to the request for a given title.

Figure 2:
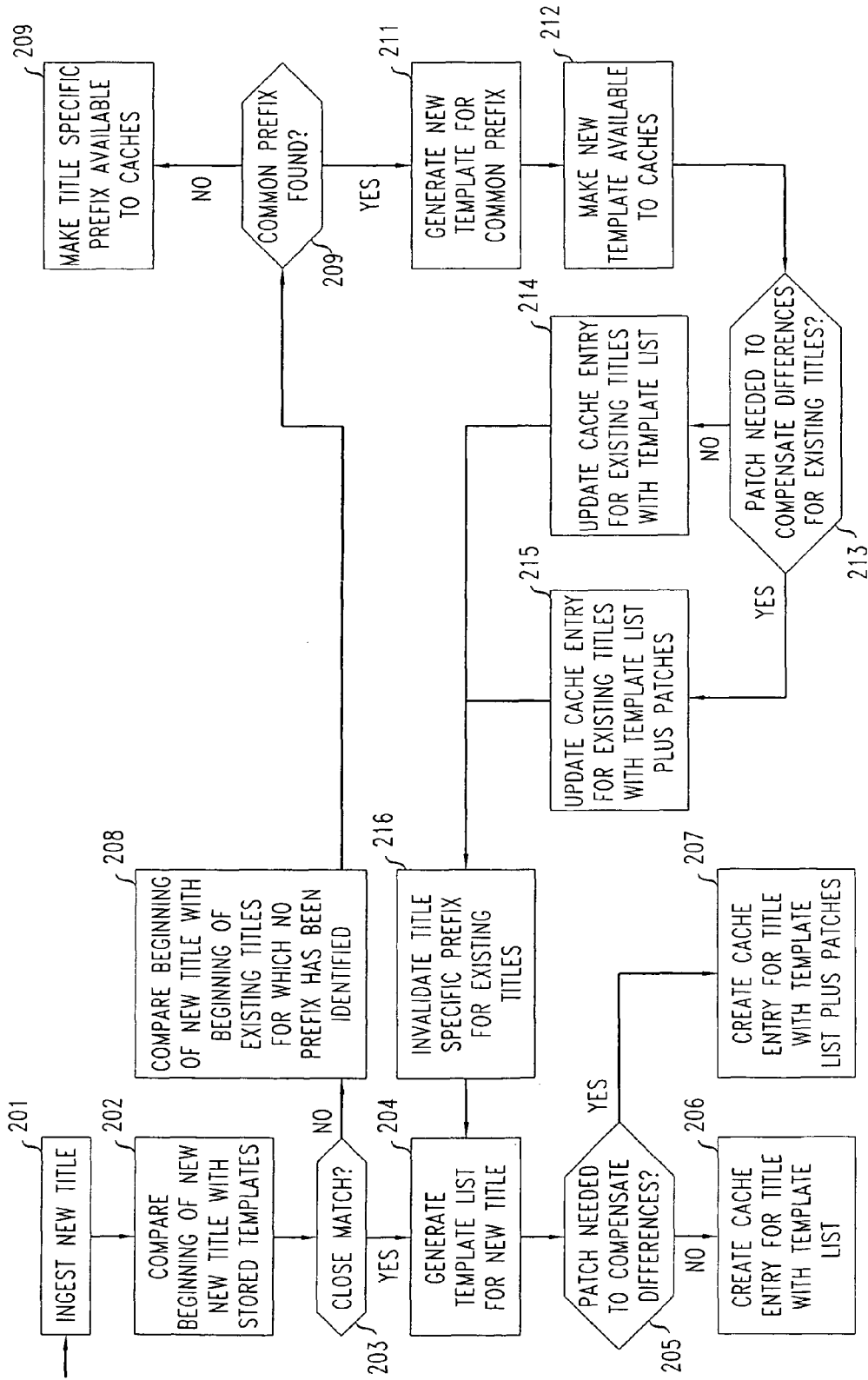
FIG. 2 shows a flowchart of an illustrative procedure for the incorporation of new video content into an illustrative system for performing template-based prefix caching in accordance with an illustrative embodiment of the present invention.

FIG. 2 shows a flowchart of an illustrative procedure for the incorporation of new video content into an illustrative system for performing template-based prefix caching in accordance with an illustrative embodiment of the present invention. As shown in the flowchart, the process begins in block 201 with the ingestion of a new video title. Block 202 then compares the beginning of the video program (of the newly ingested title) with each of the already stored templates. If a close match is found to one of the stored templates (as determined by decision box 203), a template list is generated for the new title in block 204. Next (assuming a close match was found), decision box 205 determines whether a patch is needed to compensate for the differences between the new title's prefix and the matched template, or whether the match is close enough that no patch is required.

As described above, the appropriateness of using a patch to compensate for differences may be determined based on the results of comparing the new title's prefix with the templates using conventional video comparison techniques. In particular and in accordance with one illustrative embodiment of the present invention, portions of the video streams could be identified which are slightly different—different enough that the template should not be used as is, but nonetheless close enough that applying a patch to the template is both effective and efficient. These identified portions might, for example, comprise a short sequence of video frames, a portion of the voice track, a set of (pixel) blocks in a given video frame, etc.

If it is determined by decision box 205 that no patch is required, block 206 creates a cache entry for the given title which comprises the matched template(s). If, on the other hand, it is determined by decision box 205 that a patch is required, block 207 creates a cache entry for the given title which comprises the matched template(s) plus the necessary patch(es).

In the event that a close match is not found between the beginning of the video program (of the newly ingested title) and any of the already stored templates (as determined by decision box 203), block 208 compares the beginning of the video program of the new title with the beginning of other existing titles for which no common prefix has been identified. If such a common prefix (ie., a close match between the beginning of the new title and the beginning of any other existing titles for which no common prefix has been identified) is not found, as determined by decision box 209, block 210 makes the prefix of the given title (ie., a title specific, as opposed to a common, prefix) available to the caches for use for that title (only).

If, however, a common prefix (ie., a close match with other existing titles) is found, block 211 generates a new template for the common prefix and block 212 makes the new template (i.e., the common prefix) available to the caches. Then, decision box 213 determines whether a patch is needed to compensate for the differences between the new title's prefix (i.e., the new template) and the prefix of the other existing titles with a matching prefix, or whether the match is close enough that no patch is required. If no patch is required, block 214 updates the cache entry for the matched existing titles with the template list (i.e., the new template), whereas if a patch is required, block 215 updates the cache entry for the matched existing titles with the template list (ie., the new template) plus the necessary patch(es). Finally, in either case, block 216 invalidates the previously used title specific prefix for the existing titles which have been matched to the new title (thus creating a common prefix template), and then flow continues to block 204 (see above) to generate the template list for the new title.

Figure 3:
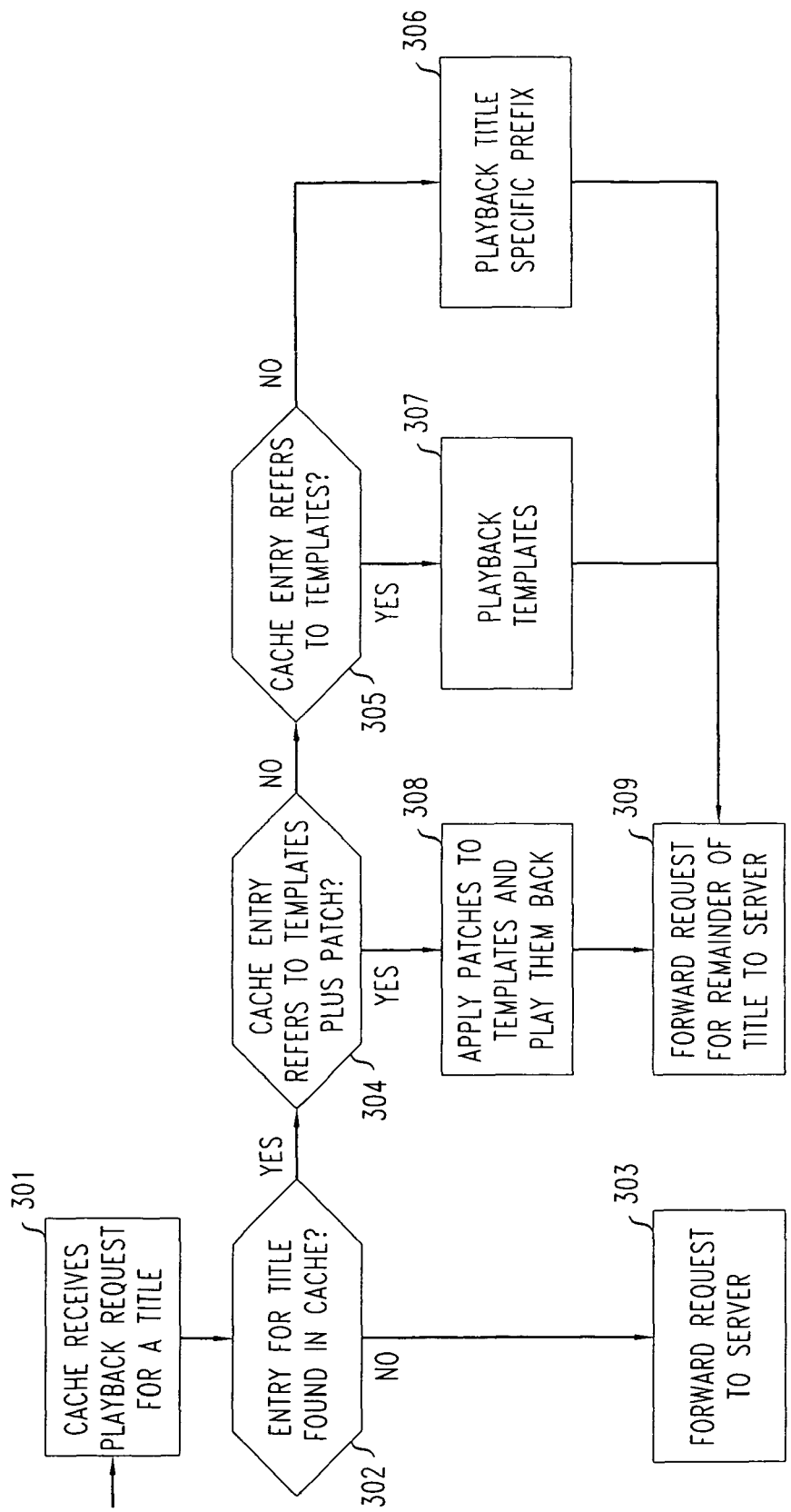
FIG. 3 shows a flowchart of an illustrative procedure for the playback of a video title by an illustrative system for performing template-based prefix caching in accordance with an illustrative embodiment of the present invention.

FIG. 3 shows a flowchart of an illustrative procedure for the playback of a video title by an illustrative system for performing template-based prefix caching in accordance with an illustrative embodiment of the present invention. The process begins in block 301 when a given cache receives a request to playback a specific video title. Then, decision box 302 determines whether the given title has an entry (of some type) in the cache. If it does not, then the request for the title is forwarded to the video server in block 303 (and the user will necessarily experience a start-up delay as a result of having no prefix—template-based or otherwise—in the local cache).

If, on the other hand, an entry for the requested title is found in the cache, decision box 304 determines whether cache entry comprises one or more prefix templates plus any associated patch(es), and if so, block 308 applies the patch(es) to the template(s) and begins the playback of the prefix(es). Otherwise, decision box 305 determines whether the cache entry comprises one or more prefix templates (without patches). If it does, block 307 plays back the prefix template(s), whereas if it does not, block 306 plays back the specific (i.e., not common) prefix associated with the given title. In any case, once the prefix (whether or not a template with or without patches) has begun to be played back, block 309 forwards the request for the given title to the video server in order to retrieve the remainder of the requested title.

Various Alternative Illustrative Embodiments

Note that, in accordance with various illustrative embodiments of the present invention, a sequence of two or more templates may be advantageously used to represent an initial portion of the video title. For example, a first template might be used to represent the copyright warning screen, which often appears first in a video title; a second template might be used to represent the studio trailer identifying the studio and/or production company, which typically appears next in a movie; and a third template might be used to represent the MPAA (Motion Picture Association of America) rating screen, which typically appears last (before the movie itself). Moreover, the above-referenced second template may, for example, be replaced by a sequence of templates—each one representing one of a plurality of studios and/or production companies involved in the production of the movie and thus each requiring a short video credit. In this manner, each of these templates will be useful in a large number of different movie titles. As such, when used herein the term "initial portion" of a video title's content is to be interpreted as not necessarily comprising the very beginning of the title's video content, but rather may include any portion of the video content which is found at or near the beginning of the video title's content.

In addition, in accordance with another illustrative embodiment of the present invention, template-based prefix caching may be advantageously combined with traditional prefix caching. In this case, the common template-based prefix may be followed by an individual prefix for a given title. The common prefix advantageously reduces the size required for the individual prefix. Furthermore, in accordance with certain illustrative embodiments of the present invention, it is possible to apply a "patch" (i.e., a small modification) to a common prefix if a title uses a slightly modified version of a stored prefix.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

What is claimed is:

1. A method for use in the delivery of video content comprised in and selected from a plurality of video titles, the method performed with use of a cache and comprising the steps of:
   receiving a request to deliver video content comprised in a given one of said video titles;
   identifying one or more prefix templates stored in the cache which are associated with said given one of said video titles, each of said identified prefix templates representing an initial portion of video content comprised in said given one of said video titles and further representing an initial portion of video content comprised in at least one other video title in said plurality of video titles; and
   delivering the video content represented by said one or more identified prefix templates.

2. The method of claim 1 further comprising the step of forwarding said request to deliver video content comprised in the given one of said video titles to a video server, for delivery of a remaining portion of video content comprised in said given one of said video titles.

3. The method of claim 1 wherein said given one of said video titles is further associated with one or more patches to be applied to one or more of said identified prefix templates, said one or more patches stored in said cache, and wherein the step of delivering the video content represented by said one or more identified prefix templates comprises modifying the video content represented by said one or more of said identified prefix templates in accordance with said one or more patches prior to said delivery thereof.

4. The method of claim 1 further comprising the step of delivering video content represented by one or more title specific prefixes associated with the given one of said video titles.

5. A method for use in the delivery of video content comprised in and selected from a plurality of video titles, the method performed with use of a cache and comprising the steps of:
   receiving a new video title to be included in said plurality of video titles;
   comparing an initial portion of video content comprised in said new video title to video content comprised in one or more other video titles in said plurality of video titles;
   generating a prefix template based on said comparison of said initial portion of video content comprised in said new video title to video content comprised in said one or more other video titles in said plurality of video titles, said prefix template representing the initial portion of the video content comprised in said new video title and further representing video content comprised in at least one of said other video titles in said plurality of video titles;
   storing said generated prefix template in the cache for subsequent use in the delivery of video content; and
   associating said generated template with said new video title and with each of said at least one of said other video titles represented by said generated prefix template, for subsequent use in the delivery of video content.

6. The method of claim 5 wherein said step of generating a prefix template further comprises generating one or more patches to be applied to said generated prefix template, wherein said step of storing said generated prefix template in the cache further comprises storing said one or more generated patches in said cache, and wherein said step of associating said generated template with said new video title and with each of said at least one of said other video titles represented by said generated prefix template further comprises associating one or more of said generated patches with at least one of said new video title and said other video titles represented by said generated prefix template.

7. The method of claim 5 further comprising the step of distributing said generated prefix template to one or more other caches for subsequent use in the delivery of video content therefrom.

8. The method of claim 5 further comprising the step of storing said association of said generated template with said new video title and with each of said at least one of said other video titles represented by said generated prefix template in the cache.

9. A method for use in the delivery of video content comprised in and selected from a plurality of video titles, the method performed with use of a cache and comprising the steps of:
   receiving a new video title to be included in said plurality of video titles;
   comparing an initial portion of video content comprised in said new video title to video content represented by one or more prefix templates stored in the cache; and
   associating one or more of said prefix templates with said new video title based on said comparison of said initial portion of video content comprised in said new video title to video content represented by said one or more prefix templates stored in the cache, for subsequent use in the delivery of video content.

10. The method of claim 9 wherein said step of associating said one or more of said prefix templates with said new video title further comprises generating one or more patches to be applied to said one or more prefix templates, storing said one or more generated patches in the cache, and further associating said one or more generated patches with said new video title.

11. The method of claim 9 further comprising the step of storing said association of said one or more of said prefix templates with said new video title in the cache.

12. An apparatus comprising a cache for use in the delivery of video content comprised in and selected from a plurality of video titles, the cache comprising data representative of one or more prefix templates, each of said prefix templates representing an initial portion of video content comprised in two or more of said video titles in said plurality of video titles and being associated with said two or more of said video titles, each of said prefix templates for use in said delivery of said video content.

13. The apparatus of claim 12 wherein the cache further comprises data representative of one or more patches to be applied to said one or more prefix templates, said patches also being associated with said two or more of said video titles represented by a corresponding one of said one or more prefix templates.

14. The apparatus of claim 12 wherein the apparatus comprises a set-top box for use in delivery of video content to a user thereof.

15. The apparatus of claim 12 wherein the cache is comprised in an Internet server provided for use in delivery of video content in an Internet Protocol Television (IPTV) system to a user thereof.

16. The apparatus of claim 15 wherein the cache is comprised in a server associated with an Internet Service Provider (ISP).

17. The apparatus of claim 15 wherein the cache is comprised in a content distribution network (CDN) server.

18. The apparatus of claim 12 wherein the cache is comprised in a Digital subscriber line access memory (DSLAM) device provided for use in delivery of video content to a Digital Subscriber Line (DSL) user.

19. The apparatus of claim 12 wherein the cache further comprises one or more title specific prefixes associated with corresponding ones of said plurality of video titles.

20. The apparatus of claim 12 wherein the cache further comprises data representative of said associations between said prefix templates and said video titles.

* * * * *